United States Patent [19]

Belleville et al.

[11] Patent Number: 5,392,117
[45] Date of Patent: * Feb. 21, 1995

[54] FABRY-PEROT OPTICAL SENSING DEVICE FOR MEASURING A PHYSICAL PARAMETER

[75] Inventors: Claude Belleville, Charlesbourg; Gaétan Duplain, Quebec, both of Canada

[73] Assignees: Institut National d'Optique, Sainte-Foy; Ministere des Transports, Quebec, both of Canada

[*] Notice: The portion of the term of this patent subsequent to Apr. 13, 2010 has been disclaimed.

[21] Appl. No.: 45,680

[22] Filed: Apr. 12, 1993

Related U.S. Application Data

[63] Continuation-in-part of Ser. No. 915,645, Jul. 21, 1992, Pat. No. 5,202,939.

[51] Int. Cl.$^6$ .............................................. G01B 9/02
[52] U.S. Cl. .................................... 356/352; 356/345; 250/227.27
[58] Field of Search ................. 356/345, 349, 352; 250/227.19, 227.27; 385/12

[56] References Cited

U.S. PATENT DOCUMENTS

| | | | |
|---|---|---|---|
| 4,861,136 | 8/1989 | Stone et al. | 356/352 |
| 5,202,939 | 4/1993 | Belleville et al. | 356/345 |
| 5,280,173 | 1/1994 | Morse et al. | 356/352 |

*Primary Examiner*—Samuel A. Turner
*Assistant Examiner*—Robert Kim
*Attorney, Agent, or Firm*—Foley & Lardner

[57] ABSTRACT

The optical sensing device and the method thereof are for measuring a physical parameter. The device is to be connected to a light source which generates a multiple frequency light signal having predetermined spectral characteristics. The device comprises a Fabry-Perot interferometer through which the light signal is passed, an optical focusing device for focusing at least a portion of the light signal outgoing from the Fabry-Perot interferometer, and a Fizeau interferometer through which the focused light signal is passed. The Fabry-Perot interferometer includes two semi-reflecting mirrors substantially parallel to one another and spaced by a given distance so as to define a Fabry-Perot cavity having transmittance or reflectance properties which are affected by the physical parameter and which cause the spectral properties of the light signal to vary in response to the physical parameter. The Fabry-Perot interferometer is provided with at least one optical fiber for transmitting the light signal into the Fabry-Perot cavity and for collecting the portion of the light signal outgoing thereof. The Fizeau interferometer includes an optical wedge forming a wedge-profiled Fizeau cavity from which exits a spatially-spread light signal indicative of the transmittance or reflectance properties of the Fabry-Perot interferometer. The physical parameter can be determined by means of the spatially-spread light signal.

27 Claims, 12 Drawing Sheets

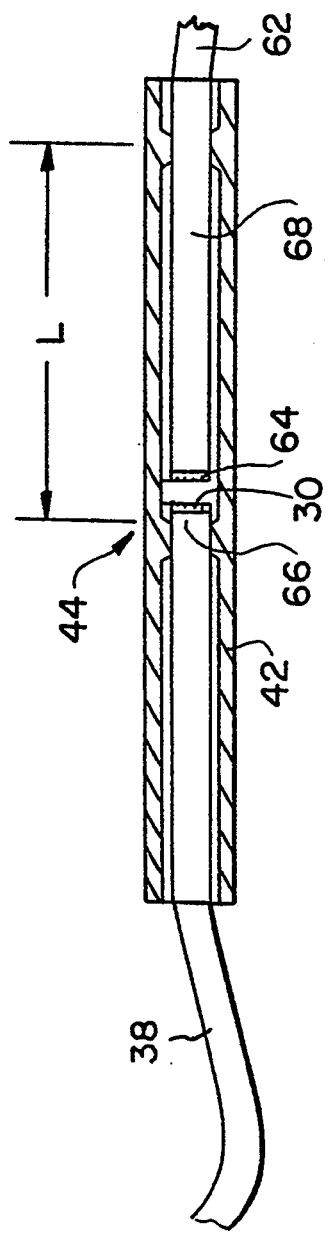
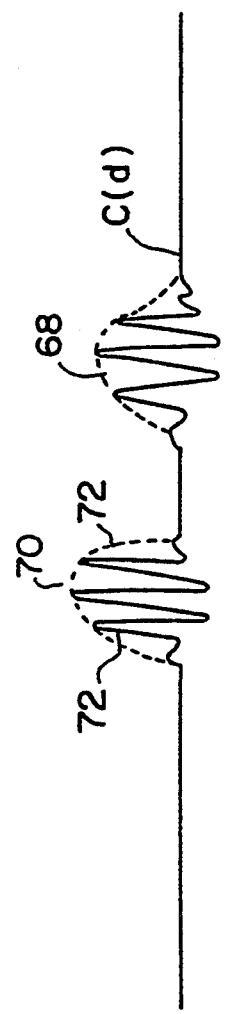

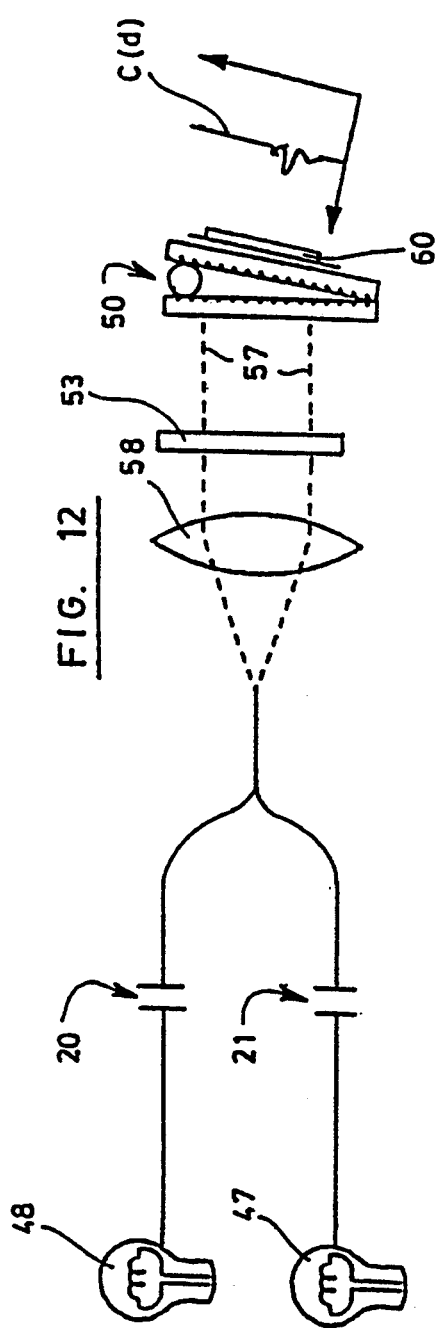
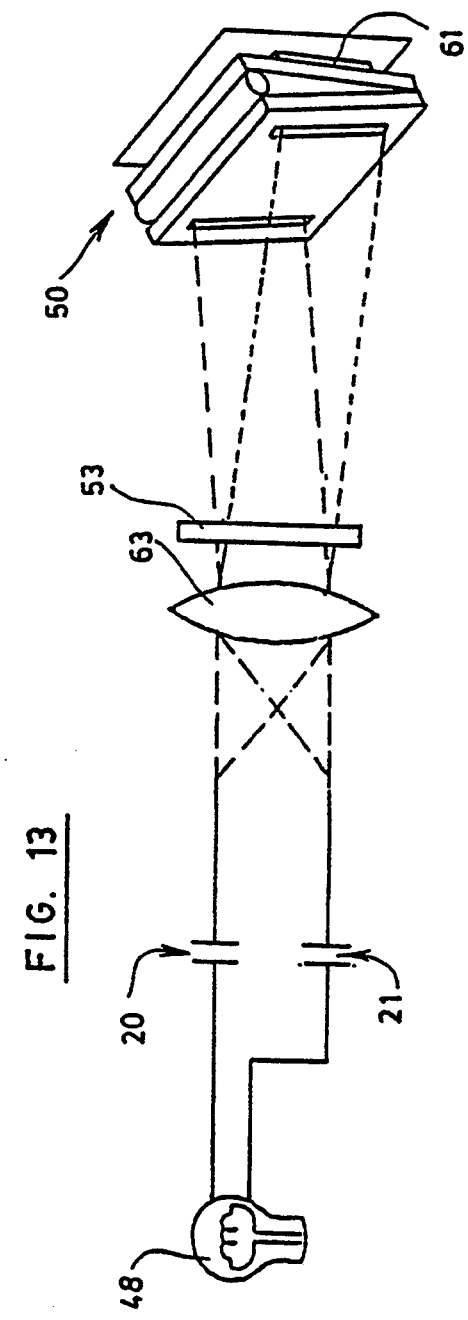

FABRY-PEROT OPTICAL SENSING DEVICE FOR MEASURING A PHYSICAL PARAMETER

CROSS REFERENCE TO RELATED APPLICATION

This application is a continuation-in-part of application Ser. No. 07/915,645, filed Jul. 21, 1992, now U.S. Pat. No. 5,202,939, by Claude Belleville et al.

BACKGROUND OF THE INVENTION

1. Field of the Invention

The present invention generally relates to the field of instrumentation, and more specifically to an optical sensing device and a method thereof, based on Fabry-Perot type interferometry, for measuring a physical parameter such as a pressure, a temperature, the refractive index of a liquid, etc., and especially a strain in or a deformation of a body.

2. Description of the Related Art

Strain sensors using optical fibers have evolved in almost all the fields involving strain sensing measurements of mechanical micro-deformations. In addition to traditional applications which are presently carried out by strain gages of resistive, piezoelectric or other types, the strain sensors using optical fibers find uses in new applications coming out from their development. For example, this is the case for smart skin sensors where the optical fibers, in reason to their small size, can be integrated within the structures to monitor.

One particular type of strain sensors using optical fibers is worthy of note. This is the Fabry-Perot type of strain sensors, which can be compared advantageously on one hand with the conventional electrical strain sensors, and on the other hand with the strain sensors using optical fibers found in the literature. The electrical strain sensors suffer however from their sensitivity to temperature and the supply current across them causing overheating. Their response is not linear, and they require frequent calibrations. Their output signal is moreover low (a few millivolts) and thus highly sensitive to bad connections and electrical or magnetic fields. Drift current may also occurs in damp conditions.

The properties inherent to optical fibers or devices overcome these drawbacks. For instance, sensors using optical fibers are immunized to electromagnetic fields, provide a better precision than traditional gauges and resist hard environment conditions.

A large number of techniques using optical fibers for strain measurements have been already proposed. Interferometric methods are almost the only ones providing precision, stability and dynamic ranges which satisfy most of the applications: on-board weighing systems for road vehicles, planes or others; systems dedicated to monitor the integrity of structures; etc.

Known in the art are the following documents: U.S. Pat. No. 4,755,668, DAVIS, Jul. 5, 1988; MURPHY et al., "Quadrature phase-shifted, extrinsic Fabry-Perot optical fiber sensors", Optics Letters/February 1991/Vol 16, No. 4, pp. 273-275; LESKO et al., "Embedded Fabry-Perot fiber optic strain sensors in the macromodel composites", Optical Engineering/January 1992/Vol. 31, No. 1, pp. 13-22; MURPHY, "Fabry-Perot fiber optic sensors in full-scale fatigue testing on an F-15 aircraft" Applied Optics/January 1992/Vol. 31, No. 4, pp. 431-433. These documents relate to Fabry-Perot strain sensors using single mode optical fibers. Consequently, the light sources used are laser sources requiring to be stabilized with extreme precision. The measures, which are relative, are carried out by scanning with either the wavelength emitted by the laser or the physical length of an optical fiber acting as a reference, therefore increasing the complexity of the measurement device and reducing its stability. The measures are relative since only the interference fringes are counted with respect to a reference number, requiring therefore further computations to determine the sensed parameter.

Also known in the art are the following documents: HARTL et al., "Fiber optic temperature sensor using spectral modulation", SPIE/1987/Vol. 838; ID Systems, "Fiberoptic sensing of physical parameters", Sensors/1987/pp. 257-261; SAASKI et al., "Measurement of physical parameters in composite materials using embedded fiberoptic sensors", SPIE/1989/Vol. 1170, pp. 143-149. These documents relate to Fabry-Perot sensors and methods involving optical fibers and broadband light sources. By passing a light signal of known distribution through a Fabry-Perot interferometer subjected to the sensed physical parameter, and by analyzing with a specific electronic processing unit the spectrum of the light signal resulting from the interferometer, the sensed parameter can be determined. However, the analysis carried out by the processing unit is time consuming, without mentioning the substantial cost to manufacture such a processing unit.

Also known in the art is the document LEFEBVRE, "White light interferometry in optical fiber sensors", Proceedings 7th OFS conference, which reviews the applications of white light interferometry in the domain of optical fiber sensors. It proposes the use of a tilted Fizeau interferometer that yields to a spatial fringe pattern that can be easily analyzed to determine spectral characteristics of a light signal. It brings forward the idea of connecting a Michelson interferometer to the Fizeau interferometer for measuring a physical parameter, which in a theoretical point of view should be possible. But the way to obtain the desired results is far from explained in a technical point of view, without mentioning that the application or use of such a Michelson interferometer can be difficult depending on the situation requirements. Indeed, the mechanical stability required for operation of the Michelson interferometer is extremely hard to achieve, without mentioning difficulties with piece alignments. No Fabry-Perot interferometers have been proposed to achieve this because the author probably knew that with such a Fabry-Perot interferometer using multimode optical fibers there would have been, at that time, difficulties to obtain a light signal having enough intensity to produce an analyzable fringe pattern.

Yet known in the art are the following documents: U.S. Pat. No. 4,861,136, STONE et al., Aug. 29, 1989; European patent published under No. 0,143,645, Mallinson et al, Jun. 5, 1985; SHABUSHNIG et al., "Formulation monitoring with a fiber optic refractive index sensor", Chemical Processing/September 1988; LEE et al., "Fiberoptic Fabry-Perot temperature sensor using a low-coherence light source", Journal of Lightwave Technology/January 1991/Vol. 9, No. 1, pp. 129-134; DELISLE et al., "Application de la modulation spectrale a la transmission de l'information", Can. J. Phys./1975/Vol. 53, pp. 1047-1053. These documents relate to various optical devices used for several purposes such as filters, communications, etc., but are either too complicated, not suitable or not cost-effective to be used for measuring physical parameters.

Therefore, an object of the present invention is to provide an optical sensing device based on a Fabry-Perot interferometric method, for measuring a physical parameter, which is simple, competitive to the electrical sensors, and cost-effective when compared with the other sensors using optical fibers of the prior art.

It is a further object of the invention to provide such an optical sensing device with an excellent measurement precision and stability, a linear absolute response which does not require additional computations before processing to the real determination of the physical parameter, and an adjustable high sensitivity and dynamic range to the physical parameter.

Still another object of the invention is to provide such an optical sensing device having a gauging portion with small dimensions, which can be used to measure several types of physical parameters, and that can be thermally autocompensated.

SUMMARY OF THE INVENTION

According to the present invention, there is provided an optical sensing device for measuring a physical parameter, to be connected to a light source for generating a multiple frequency light signal having predetermined spectral characteristics, said device comprising:

a) a Fabry-Perot interferometer through which the light signal is passed, said Fabry-Perot interferometer including two semi-reflective mirrors substantially parallel to one another and spaced by a given distance so as to define a Fabry-Perot cavity having transmittance or reflectance properties which are affected by said physical parameter and which cause said spectral properties of the light signal to vary in response to said physical parameter, said Fabry-Perot interferometer being provided with at least one optical fiber for transmitting the light signal into said Fabry-Perot cavity and for collecting at least a portion of the light signal outgoing thereof;

b) optical focusing means for focusing said at least a portion of the light signal; and c) a Fizeau interferometer through which said focused light signal is passed, said Fizeau interferometer including optical wedge means forming a wedge-profiled Fizeau cavity from which exits a spatially-spread light signal indicative of said transmittance or reflectance properties of said Fabry-Perot interferometer; whereby said physical parameter can be determined by means of said spatially-spread light signal.

Preferably, according to the present invention, the optical sensing device further comprises a microcapillary having a longitudinal bore in which said mirrors of the Fabry-Perot interferometer are mounted, said at least one optical fiber having a tip connected to a corresponding one of said mirrors, a portion extending outside said bore, and a weld with the microcapillary, whereby said microcapillary can be bonded to a body whose deformation is to be measured, in order that the distance between said mirrors changes as a result of an elongation of the microcapillary, thereby varying the transmittance or reflectance properties of said Fabry-Perot cavity. Preferably, the optical fiber is a multi-mode optical fiber.

According to the present invention, there is also provided an optical sensing method for measuring a physical parameter, comprising steps of:

a) generating a multiple frequency light signal having predetermined spectral characteristics;

b) passing the light signal in a Fabry-Perot interferometer including two semi-reflective mirrors substantially parallel to one another and spaced by a given distance so as to define a Fabry-Perot cavity having transmittance or reflectance properties which are affected by said physical parameter and which cause said spectral properties of the light signal to vary in response to said physical parameter, the light signal being transmitted into said Fabry-Perot cavity with at least one optical fiber, and at least a portion of the light signal outgoing from said Fabry-Perot cavity being collected with said at least one optical fiber;

c) focusing said at least a portion of the light signal; and d) passing the focused light signal through a Fizeau interferometer for converting the focused light signal into a spatially-spread light signal indicative of said transmittance or reflectance properties of said Fabry-Perot interferometer;

whereby said physical parameter can be determined by means of said spatially-spread light signal.

The present invention as well as its numerous advantages will be better understood by the following nonrestrictive description of possible embodiments made in reference to the appended drawings.

BRIEF DESCRIPTION OF THE DRAWINGS

FIG. 8 is an embodiment of a Fabry-Perot interferometer thermally compensated;

FIG. 9 shows a graph of a cross-correlation function of the transmittance (or reflectance) for two Fabry-Perot interferometers in series;

FIG. 12 is an embodiment of an optical sensing device in which two Fabry-Perot interferometers are multiplexed in time;

FIG. 13 is an embodiment of an optical sensing device in which two Fabry-Perot interferometers are multiplexed in space;

DETAILED DESCRIPTION OF THE PREFERRED EMBODIMENTS

Figure 1:
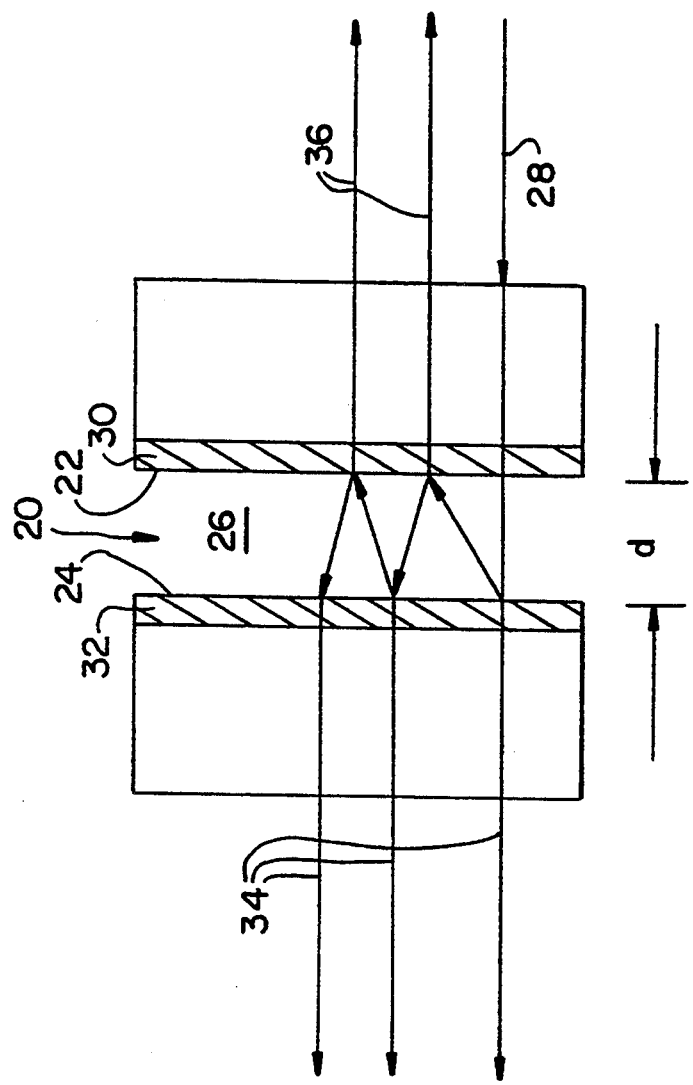
FIG. 1 is a schematic representation of a Fabry-Perot interferometer.

In the following description and in the drawings, the same numerals refer to same elements.

Referring to FIG. 1, the optical sensing device according to the invention is based on a Fabry-Perot type interferometric method. A Fabry-Perot interferometer 20 consists of two plane, parallel, reflecting surfaces 22, 24 separated by some distance d. For such a Fabry-Perot cavity 26 defined between the reflecting surfaces 22, 24, a light signal is fully transmitted if the cavity length d is an integer number of half wavelength, while the other wavelengths are partly reflected. A light plane wave 28 propagated along the normal of two mirrors 30, 32 will be partially transmitted 34, the rest being reflected 36 (losses can be neglected). The transmittance or reflectance function T, defined as the ratio of the transmitted intensity to the incident intensity, of such a Fabry-Perot cavity 26 is given by the following relation:

$$T(\lambda, d) = \frac{1}{1 + F \cdot \sin^2\left[\frac{2 \cdot \pi n \cdot d}{\lambda}\right]} \quad (1)$$

where:

d is the distance separating the mirrors 30, 32 (cavity length);

n is the refractive index of the material separating the two mirrors 30, 32 (for example for air, n=1)

$\lambda$ is the wavelength of the light signal 28; and

F (the finesse) is equal to $[4R/(1-R)]^2$, R being the reflectance of the mirrors 30, 32.

Figure 2A:
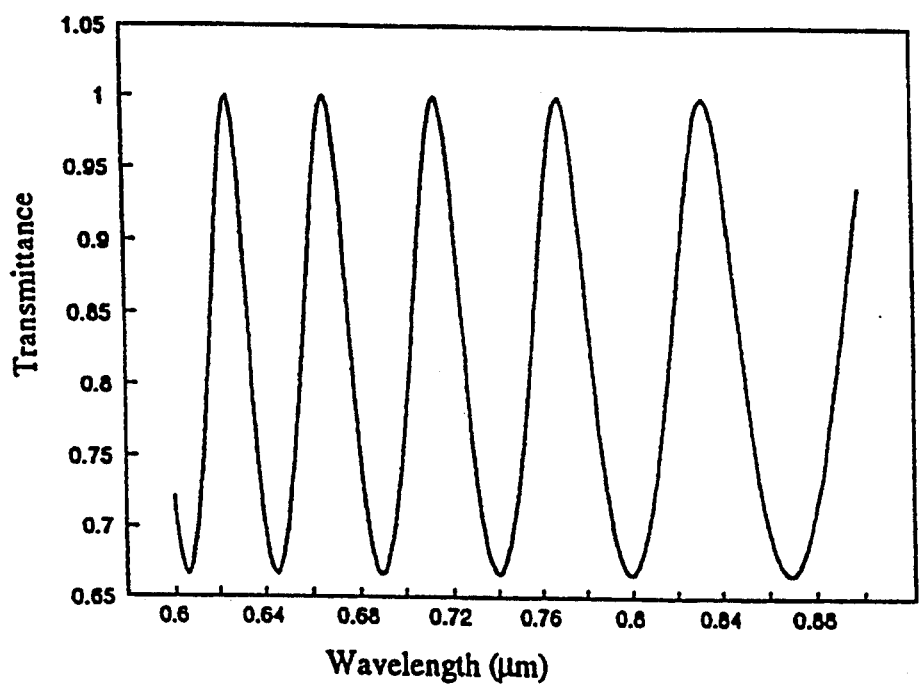
FIGS. 2a and 2a show graphs of the transmittance as a function of wavelength for two different Fabry-Perot cavity lengths.
Figure 2B:
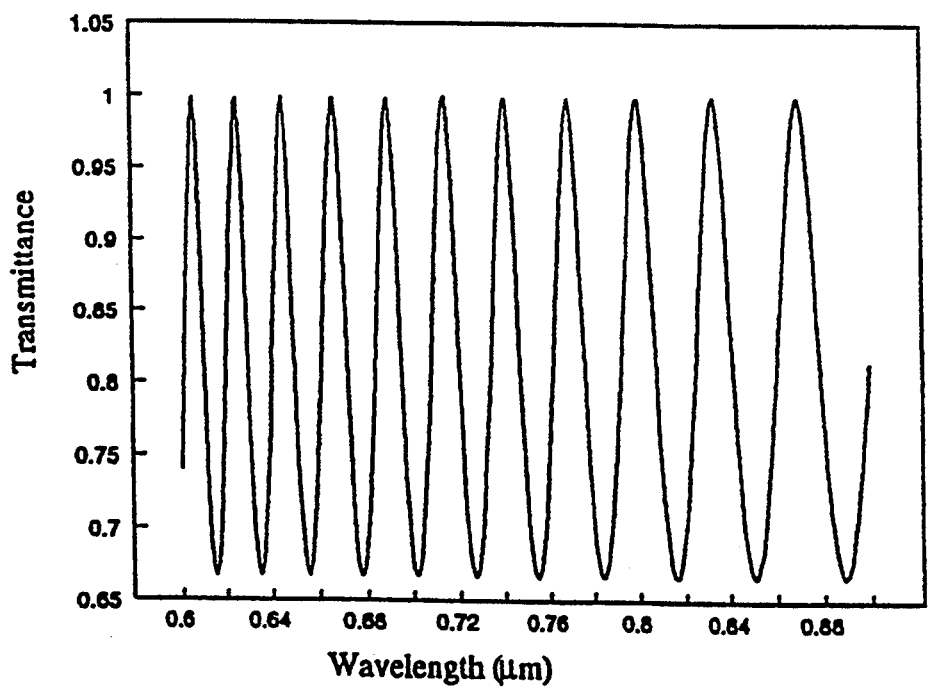

For a Fabry-Perot interferometer 20 made up of two mirrors 30, 32 of a given reflectance R, the finesse F is evidently constant. On the other hand, the cavity length d as well as the wavelength $\lambda$ of the light signal 28 propagated through the interferometer 20 can vary. Consider a Fabry-Perot interferometer 20 with a fixed gap. As calculated with relation (1), the transmittance or reflectance T as a function of wavelength $\lambda$ takes the form of a sinus with a wavelength's increasing period as shown in FIG. 2a. Now if the cavity length d varies, the sinus will be subjected to a phase shift accompanied by a variation of the period as shown in FIG. 2a. For a given cavity length d, the transmittance or reflectance T of a Fabry-Perot interferometer 20 as a function of the wavelength $\lambda$ is unique. The transmittance or reflectance function T can thus be qualified as a signature of the cavity length d, and this is true for each value of cavity length d. Therefore, the Fabry-Perot cavity length d can be calculated from the transmitted 34 (or reflected 36) light spectrum.

Figure 3:
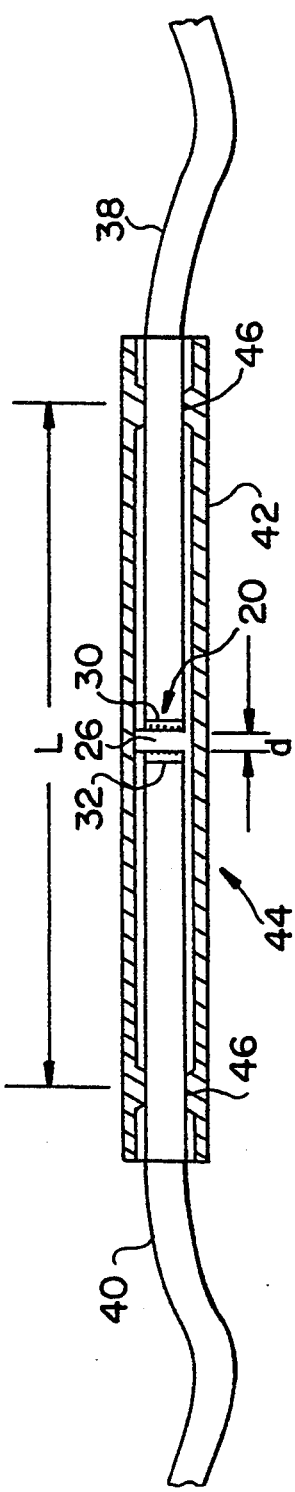
FIG. 3 is an embodiment of a Fabry-Perot interferometer.

Referring to FIG. 3, the Fabry-Perot interferometer 20 (as shown in FIG. 1) can be used for measuring a strain parameter by providing a microcapillary 42 having a longitudinal bore in which the mirrors 30, 32 of the Fabry-Perot interferometer 20 are mounted. The optical fibers 38, 40 have each a tip connected to a corresponding one of the mirrors 30, 32, a portion extending outside the bore, and a weld with the microcapillary 42. The microcapillary 42 can be bonded to a body whose deformation or strain is to be measured, in order that the distance d between the mirrors 30, 32 changes as a result of an elongation of the microcapillary 42, thereby varying the transmittance or reflectance properties of the Fabry-Perot cavity 26. The two optical fibers 38, 40, having their tip polished at right angle and coated with the 30% semi-reflective thin layer mirrors 30, 32, are inserted into the quartz microcapillary 42. The Fabry-Perot cavity 26 is made up of the mirrors 30, 32 deposited on the tip of the optical fibers 38, 40. The optical fibers 38, 40 are then welded at the end of the microcapillary 42 either by a $CO_2$ laser or an electric arc. The use of a $CO_2$ laser allows to precisely control the gage making process, necessary to obtain reproducible results at advantageous manufacturing costs. If such a strain gage 44 formed by the Fabry-Perot interferometer 20 with the microcapillary 42 is bonded to the above-mentioned body, the variation of the Fabry-Perot cavity length d due to the deformation of the body can be translated in strain measurement. The gage length L, defined as the distance separating the welds 46, determines the sensitivity of this strain gage 44. Indeed, the whole elongation of the microcapillary 42 in the gage length region being completely transferred to the Fabry-Perot cavity length d, the sensitivity of the strain gage 44 increases with an increasing gage length L. The sensitivity, and inversely the range of strain, can be therefore adjusted by a proper gage length L.

Figure 4:
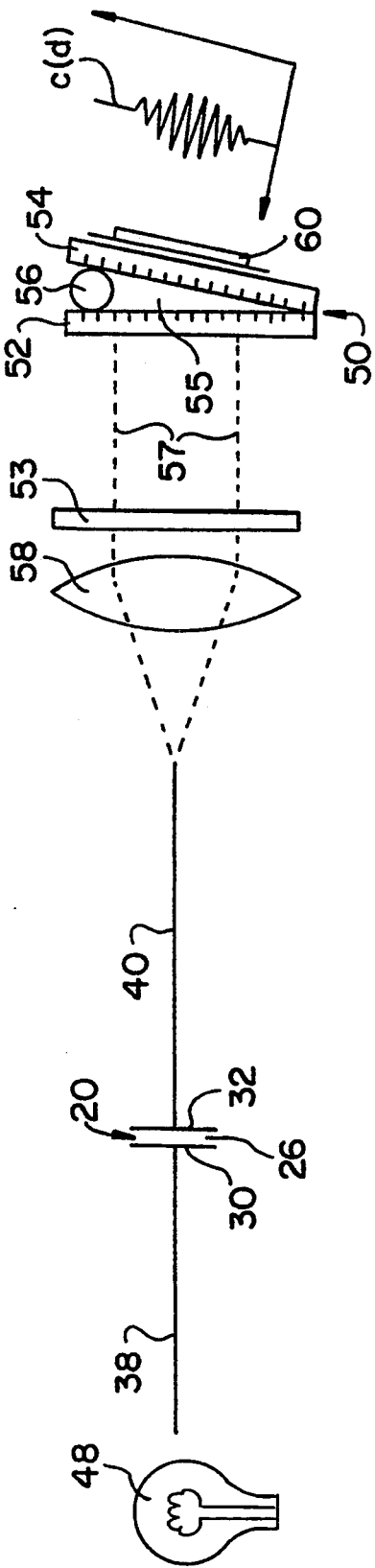
FIG. 4 is an embodiment of an optical sensing device in transmission.

Referring to FIG. 4, an optical sensing device for measuring a physical parameter is connected to a light source 48 for generating a multiple frequency light signal having predetermined spectral characteristics. The device comprises a Fabry-Perot interferometer 20 (such as the one shown in FIG. 3) through which the light signal is passed, an optical focusing lens 53 (such as a cylindrical lens) for focusing at least a portion of the light signal outgoing the Fabry-Perot interferometer 20, and a Fizeau interferometer 50 through which the focused light signal is passed. The Fabry-Perot interferometer 20 includes two semi-reflective mirrors 30, 32 substantially parallel to one another and spaced by a given distance so as to define a Fabry-Perot cavity 26 having transmittance or reflectance properties which are affected by the physical parameter and which cause the spectral properties of the light signal to vary in response to the physical parameter. The Fabry-Perot interferometer 20 is provided with at least one optical fiber 38 (a second optical fiber 40 being also used for the present embodiment, the first optical fiber 38 being optically coupled with the light source 48, and the second optical fiber 40 being optically coupled to the focusing lens 53) for transmitting the light signal into the Fabry-Perot cavity 26 and for collecting the portion of the light signal outgoing thereof. Preferably, the optical fibers 38, 40 are multimode optical fibers. The Fizeau interferometer 50 includes an optical wedge forming a wedge-profiled Fizeau cavity 55 from which exits a spatially-spread light signal indicative of the spectral characteristics resulting from the Fabry-Perot interferometer 20. Thereby, the physical parameter can be determined by means of the spatially-spread light signal.

In operation, the luminous flux emitted by the light source 48 (formed for example by a quartz-halogen lamp or a broadband LED) is launched into the leading optical fiber 38. The light beam propagated inside the leading optical fiber 38 goes through the Fabry-Perot interferometer 20 to be partially transmitted into the collecting optical fiber 40 and partially reflected into the leading optical fiber 38. By measuring the transmitted light spectrum $X(\lambda)$ or the reflected light spectrum equal to $1 - X(\lambda)$, the length d of the Fabry-Perot cavity 26 can be calculated. The calculation can be accomplished by cross-correlating the measured spectrum $X(\lambda)$ with the theoretical transmittance function $T(\lambda,d)$ given by relation (1). The cross-correlation coefficient is then calculated as a function of the cavity length d with the following relation:

$$C(d) = \frac{1}{M} \cdot \sum_{n=0}^{M-1} X(\lambda_0 + n\Delta\lambda) \cdot \frac{1}{1 + F \cdot \sin^2\left[\frac{2 \cdot \pi \cdot n \cdot d}{\lambda_0 + n\Delta\lambda}\right]} \quad (2)$$

where the effective cavity length d is given by a maximal cross-correlation coefficient $C(d)_{max}$.

Figure 5:
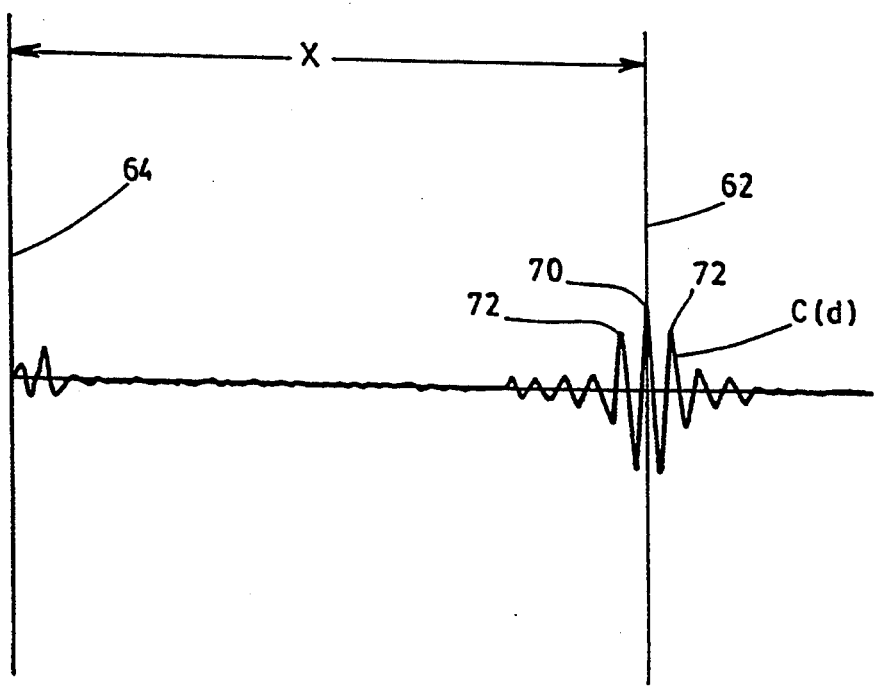
FIGS. 5 and 6 show graphs of cross-correlation functions of the transmittance (or reflectance) for two different Fabry-Perot cavity lengths.
Figure 6:
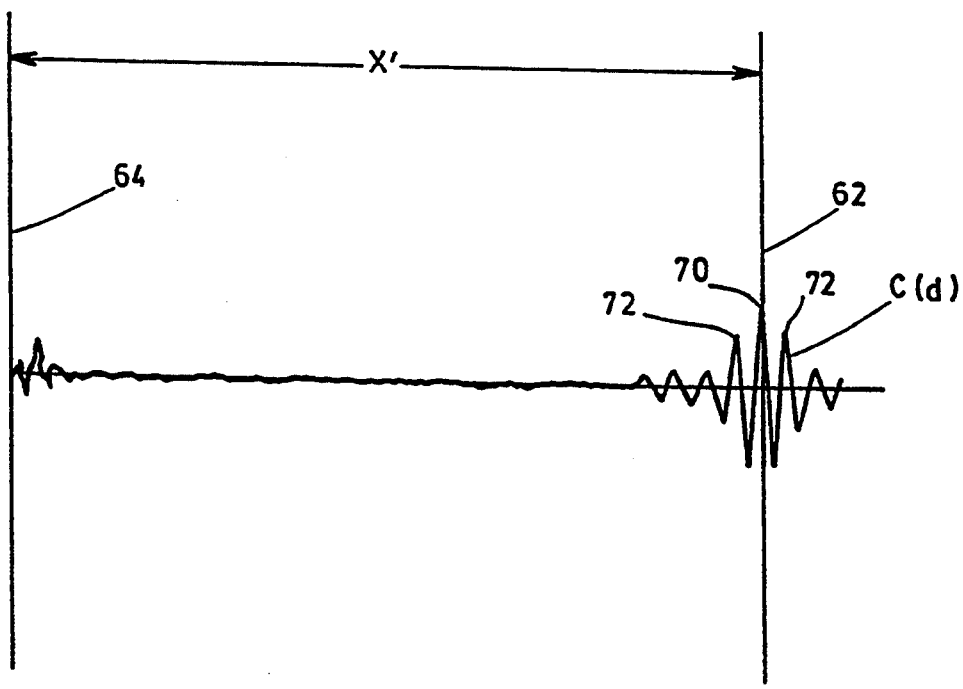

However, the measurement of the transmitted (or reflected) light spectrum needs sophisticated apparatus on one hand, and the calculation of the cross-correlation function is very time consuming on the other hand. To overcome those deficiencies, a method has been developed for instantaneously providing the cross-correlation function C(d) by means of an optical cross-correlator. This optical cross-correlator is merely the Fizeau interferometer 50. The Fizeau interferometer 50 consists of two flat glass plates 52, 54 each having one face with the same reflecting properties as the mirrors 30, 32 of the Fabry-Perot interferometer 20. The reflecting face of the two flat glass plates 52, 54 are brought closer to form an air wedge. The distance between those reflecting faces may vary from 0 μm to 40 μm, the wedge being determined by the spacer 56. To improve the robustness of the Fizeau interferometer 50, the latter can also be made by laying down on the plate 54 a thin layer of $Al_2O_2$ or any other suitable dielectric material of variable width profiled as a wedge, instead of the other plate 52. The Fizeau interferometer 50 works like a cross-correlator with a cavity length depending on the position on the wedge. For example, the light intensity transmitted through the Fabry-Perot interferometer 20 having a cavity length d of 25 μm will be maximally transmitted by the Fizeau interferometer 50 exactly at the position where the distance between the flat glass plates 52, 54 equals 25 μm. If the Fabry-Perot cavity length d of the optical sensing device varies in response to a mechanical deformation, the position on the Fizeau interferometer 50 of the maximally transmitted light intensity will shift correspondingly in a fashion similar to what is shown in FIGS. 5 and 6. Therefore, the parameter to measure can be easily determined with respect to a shift which has occurred in the maximally transmitted light intensity.

The cross-correlation is instantaneously produced by illuminating the whole width of the Fizeau interferometer 50. This goal is achieved by focusing the light signal outgoing from the optical fiber 40 on a line (limited between the dotted lines 57) by means of the focusing lens 53, thereby affecting the light signal (which outgoes the optical fiber 40 with a circular geometry) only along one of its axes. Although not essential, the optical sensing device can be further provided with a collimating lens 58 (such as a spherical lens) for collimating the light signal or reducing its divergence. In that case, the collimating lens 58 is optically coupled between the optical fiber 40 of the Fabry-Perot interferometer 20 and the focusing lens 53. The light signal transmitted through the Fizeau interferometer 50 is then detected by a photodetector 60 positioned for receiving the spatially-spread light signal outgoing from the Fizeau cavity 55, for generating a set of discrete electrical signals representing the spatially-spread light signal. This photodetector 60 can be for example a linear photodiode array or a CCD array. Therefore, the cross-correlation function C(d) is coded on the pixels of the photodetector 60, each pixel corresponding to a given correlated Fabry-Perot cavity length d. The cavity length d may vary for instance from 0 μm to 40 μm. The cavity length d of the Fabry-Perot interferometer 20 is finally given by the position of the pixel reading the maximum light intensity. The detection of the maximum can then be translated in strain by means of the following relation:

$$\epsilon = \frac{\Delta L \cdot \tan(\gamma)}{L} \quad (3)$$

where:
  ΔL is the distance, on the photodetector 60, separating the unstrained coefficient of maximum cross-correlation from the strained one;
  γ is the angle between the flat glass plates 52, 54 of the Fizeau interferometer 50 ($\approx 0,03°$); and
  L is the gauge length of the Fabry-Perot interferometer 20.

With the Fizeau interferometer 50 can be achieved a precise, stable, fast and inexpensive measurement.

FIG. 5 shows a typical signal reading from the photodetector 60 (shown in FIG. 4) after being filtered with an electronic bandpass filter (not shown in the Figures). The pixels, scanned at a rate of 1 kHz, exhibit the cross-correlation function C(d) of the FabryPerot interferometer 20 cross-correlated with the Fizeau interferometer 50. The line cursor 62 indicates that the maximum intensity peak 70 is X=760,4 μs apart from the beginning of the scan indicated by the vertical line 64. For a 512 pixels photodiode array (acting as the photodetector 60 shown in FIG. 4) scanned at a rate of 1 kHz, this corresponds to the 389th pixel. FIG. 6 illustrates the signal reading for the same Fabry-Perot interferometer 20 submitted to a given mechanical deformation. The maximum intensity peak 70 has now shifted to X'=905,6 μs, corresponding to the 464th pixel.

Referring to FIGS. 4, 5 and 6, the presence of the lateral peaks 72 in the cross-correlation function C(d) can be very useful. Indeed, the distance between two peaks corresponds to the half of the wavelength at the center of the wavelength range. For a wavelength range from 600 nm to 1000 nm, it corresponds approximately to 800 nm/2=400 nm. To each pixel of the photodetector 60 is combined a different spacing between the plates 52, 54 of the Fizeau interferometer 60, this spacing being cross-correlated with the Fabry-Perot interferometer 20. The first lateral peaks 72 located on both sides of the maximal peak 70 will thus appear when the distance between the plates 52, 54 of the Fizeau interferometer 50 will have increased (or decreased) of 400 nm. This distance only depends of the angle between the plates 52, 54. For a given Fizeau interferometer, the peaks will always be equally spaced from one another whatever the cavity length d of the Fabry-Perot interferometer 20. When the cavity length d varies, the cross-correlation function C(d) will shift accordingly without changing its form. By scanning the pixels of the photodetector 60 at a constant frequency, the cross-correlation signal has always the same frequency and it is therefore possible to filter the cross-correlation function C(d) by means of a band-pass filter (not shown in the Figures) for extracting only the useful signal. This allows in particular to suppress any other signal modulation caused by the presence of dust particles, by a light intensity variation, etc.

Actually, the only photodetectors which can be properly applied to detect the cross-correlation function C(d) are made of silicon components. Those which may be used in the infrared are still very expensive while having only a few number of pixels. The use of silicon photodetectors restricts the useful wavelength range of the optical sensing device from roughly 600 nm to 1000 nm. On the other hand, the broadband light sources available in this region, either quartz-halogen or LEDs, cannot be used with a single mode optical fiber since the power launched into the optical fiber is too low. Consequently, a multimode optical fiber as the optical fibers 38, 40 must be used. However, the visibility of the cross-correlation function C(d) depends on the modulation depth of the light signal transmitted (reflected) by the Fabry-Perot interferometer 20, which is directly related to the finesse F of the Fabry-Perot cavity 26 (relation (1)). In order to maintain a suitable finesse F, the divergence of the light beam propagated by the optical fiber 38 must be as low as possible. The optimal numerical aperture (NA) of the optical fiber 38, a value representative of the divergence of the light beam, has been roughly estimated to 0,13. Actually, the lowest numerical aperture for commercial multimode fibers is about 0,2, a value relatively high for the purposes. Special optical fibers have been however easily manufactured for the current application. Their core diameter is 50 μm with a NA of 0,13.

Figure 7:
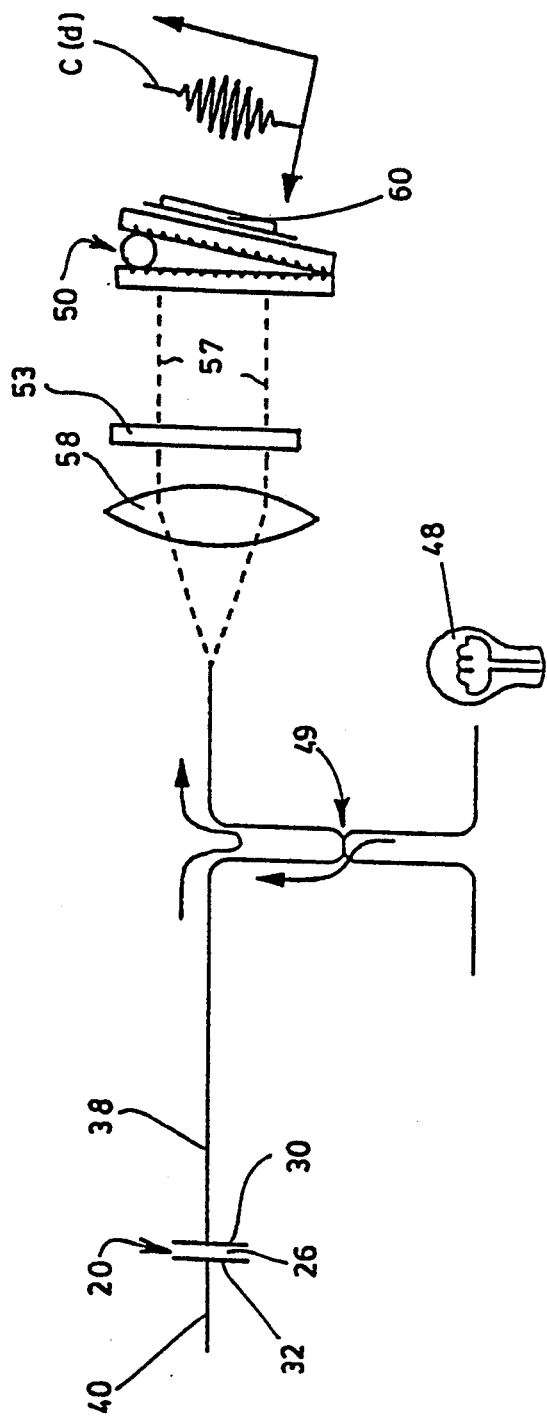
FIG. 7 is an embodiment of an optical sensing device in reflection.

Referring to FIG. 7, in addition to the embodiment of the optical sensing device used in transmission as shown in FIG. 4, an embodiment of the optical sensing device in reflection is also proposed. The configuration of such an optical sensing device in reflection is evidently more compact. The optical sensing device further comprises an optical coupler 49 optically coupled between the optical fiber 38, the focusing lens 53 and the light source 48, for coupling the light signal into the optical fiber 38 and for coupling the reflected portion of the light signal collected from the Fabry-Perot cavity 26 and transmitted by the optical fiber 38 into the focusing lens 53.

Referring to FIG. 8, the reflective configuration also allows the development of a thermally auto-compensated optical sensing device. The optical fiber 38 is inserted in one end of the microcapillary 42 and a thin wire 62 made of the same material as the body whose deformation is to be measured (not shown in the Figure) is inserted in the other end of the microcapillary 42. The tip of the wire 62 is coated with an absorbing material 64 like Inconel (Trademark) exhibiting a reflectance of nearly 30% in order to form a mirror as the mirror 32 (as shown in FIG. 7), absorbing the rest of the light signal. The optical fiber 38 cannot move in the bore of the microcapillary 42 since its tip 66 is welded thereto, while the portion 68 of the wire 62 within the bore of the microcapillary 42 can move freely. The gage length L is entirely in the region of the portion 68 of the wire 62. A mechanical deformation will produce a variation of the cavity length d in a similar way as described earlier. On the other hand, a thermal expansion of the body (not shown in the Figure) will be compensated by a similar thermal expansion of the portion 68 of the thin wire 62 moving in the opposite direction in the bore. The optical sensing device can be compensated for different material by changing the material of the thin wire 62 as well.

Figure 10:
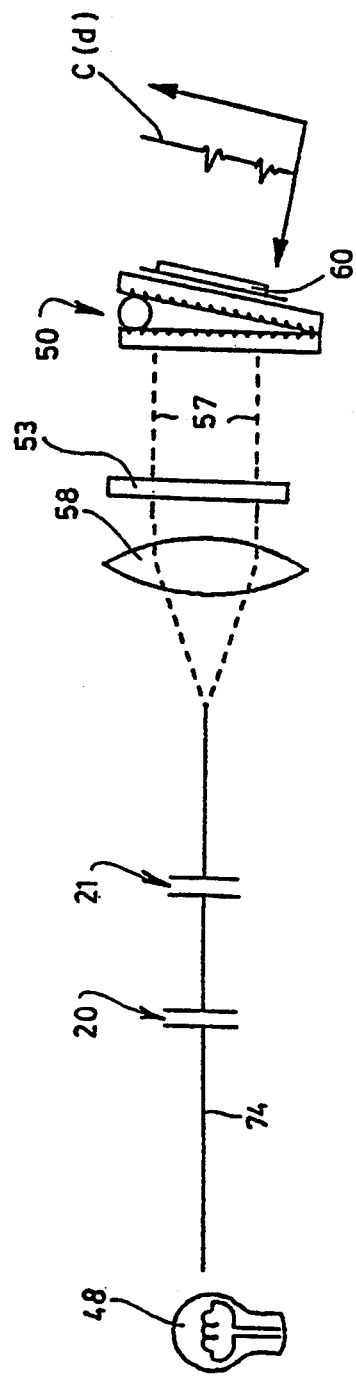
FIG. 10 is an embodiment of an optical sensing device in which two Fabry-Perot interferometers are multiplexed in transmission.

Referring to FIGS. 9 and 10, more than one Fabry-Perot interferometer 20 can be multiplexed and simultaneously detected by the same Fizeau analyzer 50. In the embodiment shown in FIG. 10, the optical sensing device further comprises at least a second Fabry-Perot interferometer 21 similar in structure to the first Fabry-Perot interferometer 20 and connected thereto in series. The first Fabry-Perot interferometer 20 is optically coupled to the light source 48, and the second Fabry-Perot interferometer 21 is optically coupled to the focusing lens 53. Thereby, at least another physical parameter can be measured by means of the second Fabry-Perot interferometer 21, the spatially-spread light signal simultaneously exhibiting information on the physical parameter in respect with each of the Fabry-Perot interferometers 20, 21. Indeed, if the cavity lengths d of the multiplexed Fabry-Perot interferometers 20, 21 are sufficiently different, their respective coefficient of maximal cross-correlation will be directly demultiplexed by the Fizeau analyzer 50. There is no crosstalk if the envelope 68 of their crosscorrelation function C(d) does not overlap as shown in FIG. 9. The use of a broadband light source 48 improves not only the contrast of the maximal cross-correlation pic 70 with lateral peaks 72, but it also reduces the width of the cross-correlation envelope 68. The Fabry-Perot interferometers 20, 21 can thus be multiplexed in transmission. The Fabry-Perot interferometers 20, 21 are optically coupled in series along the same optical fiber 74 and multiplexed one after the other.

For allowing the simultaneous multiplexing of more than one Fabry-Perot interferometer 20 at a time, and for allowing a good discrimination between the maximal intercorrelating peak 70 and the lateral peaks 72 of the intercorrelation function C(d), the spectral band of the light source 48 should be as broad as possible. The spectral band should preferably have a range from 600 nm to 1000 nm. There are commercially available LEDs (light emitting diodes) having a broad spectral band, which can be used alone or combined with other LEDs in order to widen the wavelength range. The actual state of technology does not permit to obtain with LEDs results comparable to the ones obtained with the use of a quartz-halogen lamp. However, in cases requiring a low energy consumption, such as in space applications, the use of LEDs are advantageous. By the way, the power of the light signal launched in the optical fiber 74 should be sufficient.

The numerical aperture (NA) of the multimode optical fiber 74 should be low. The lower the NA, the better is the visibility of the intercorrelation function C(d). However, the luminous power launched in the optical fiber 74 decreases when the NA is reduced. An optical fiber having a NA of 0,13 and a core diameter from 50 μm to 62.5 μm have been estimated to provide the best results, though a multimode optical fiber with a NA lower or equal to 0,2 is still acceptable.

Figure 11:
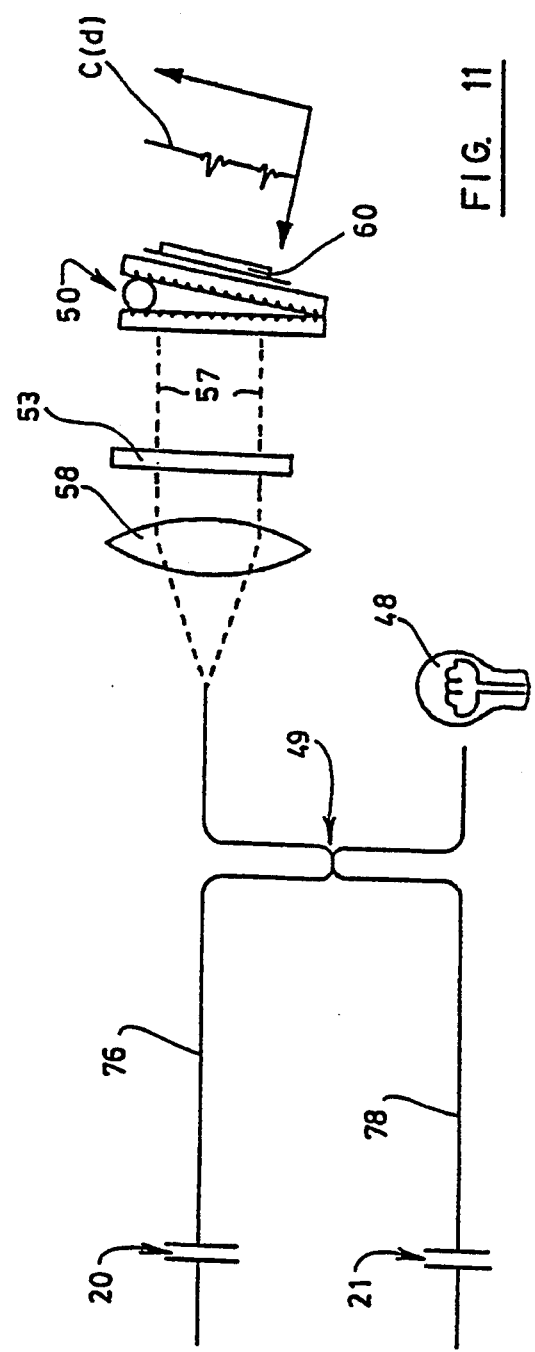
FIG. 11 is an embodiment of an optical sensing device in which two Fabry-Perot interferometers are multiplexed in reflection.

Referring to FIG. 11, the Fabry-Perot interferometers 20, 21 can as well be multiplexed in reflection on different optical fibers 76, 78. In that case, the optical sensing device further comprises an optical coupler 49 optically coupled to the optical fibers 76, 78 of the Fabry-Perot interferometers 20, 21, to the light source 48 and to the focusing lens 53, for coupling the light signal into each of the optical fibers 76, 78 and for coupling the portion of the light signal outgoing from each of the Fabry-Perot interferometers 20, 21 and transmitted by the optical fibers 76, 78 into the focusing lens 53.

Other multiplexing methods, simultaneous or not, can be also applied to the optical sensing device to allow a greater number of Fabry-Perot interferometers to be multiplexed.

Referring to FIG. 12, there is shown a method allowing a multiplexing in time of several Fabry-Perot interferometers 20, 21 (although only two are shown in the Figure) with a same Fizeau interferometer 50. At least a second light source 47 is provided for this purpose. Each of the Fabry-Perot interferometers 20, 21 is optically coupled between the corresponding one of the light sources 47, 48 and the focusing lens 53. Only one of the light sources 47, 48 operates at a time such that the spatially-spread light signal only exhibits information on the physical parameter in respect with the one of the Fabry-Perot interferometers 20, 21 connected to the operating light source 47, 48. The Fabry-Perot interferometers 20, 21 are then selected one after the other by activating the corresponding light source 47, 48.

FIG. 13 illustrates a method allowing spatial multiplexing of several Fabry-Perot interferometers 20, 21 (although only two are shown in the Figure) with a same Fizeau interferometer 50 by use of a bidimensional photodetector 61. To each of the Fabry-Perot interferometers 20, 21 is combined one or several columns of photodetectors 61. Each of the Fabry-Perot interferometers 20, 21 is optically coupled in parallel between the light source 48 and the focusing lenses 63. The focusing lenses 63 are arranged to produce at least a second focused light signal derived from the second Fabry-Perot interferometer 21 and distinct from the first focused light signal. The Fizeau interferometer 50 is also arranged to produce at least a second spatially-spread light signal derived from the second focused light signal and distinct from the first spatially-spread light signal. This can be done by simply directing the focused light signals over different locations on the Fizeau interferometer 50. The bidimensional photodetector 61 used is a two-dimensional photodiode array generating a second set of discrete electrical signals representing the second spatially-spread light signal. Thereby, at least another physical parameter can be measured by means of the second Fabry-Perot interferometer 21, each of the spatially-spread light signals exhibiting respectively the spectral characteristics resulting from the corresponding one of the Fabry-Perot interferometers 20, 21.

Figure 14:
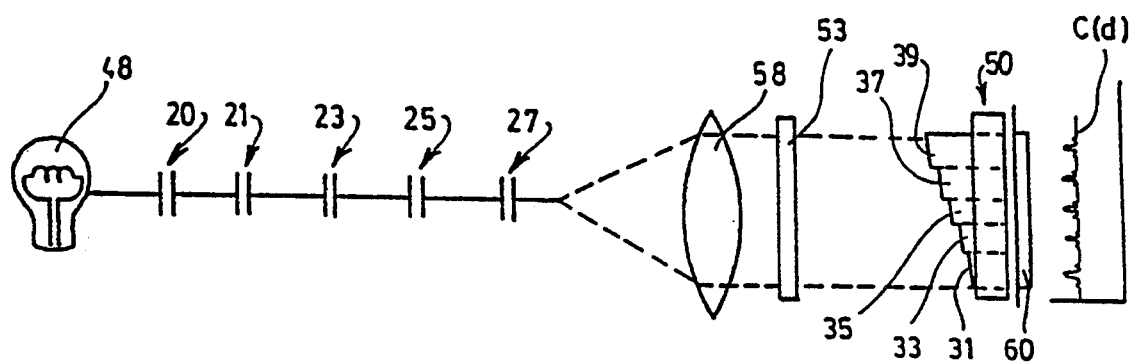
FIG. 14 is an embodiment of an optical sensing device in which five Fabry-Perot interferometers are multiplexed in transmission, and in which a Fizeau interferometer has a stepped-profiled cavity.

Referring to FIG. 14, a stepped-profile Fizeau cavity 50 provides predetermined ranges 31, 33, 35, 37, 39 of cavity length each corresponding to one of the Fabry-Perot interferometers 20, 21, 23, 25, 27 connected in series. The ranges 31, 33, 35, 37, 39 are clearly distinct from one another to avoid any crosstalk of the light signals.

Figure 15:
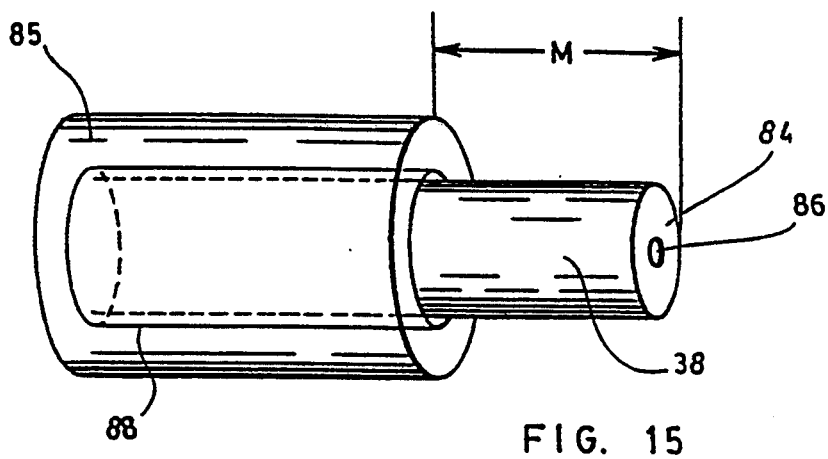
FIG. 15 is an enlarged view of a masked optical fiber.
Figure 16:
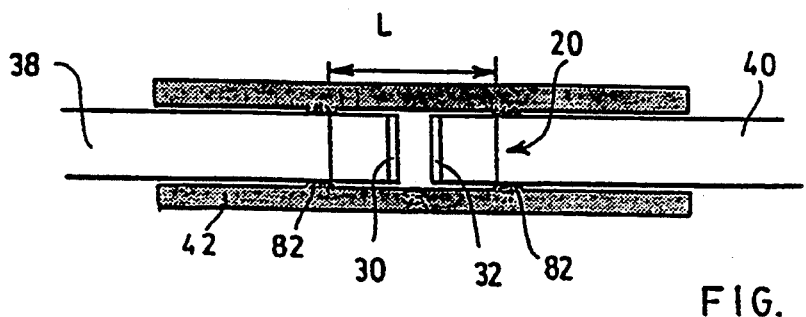
FIG. 16 is an embodiment of a Fabry-Perot interferometer having a precise gage length.

Referring to FIG. 16, a method of ion plating allows to coat the optical fibers 38, 40 with thin layers of dielectric material not only on their tips but also all around them. As shown in FIG. 15, the thin layers all around the tips of the fibers can be precisely terminated by masking with a microcapillary 85 a portion M of the optical fiber 38 to leave exposed for covering it after with the thin layer. By using a dielectric material (such as $ZrO_2$) having a temperature melting point higher than the temperature melting point of the microcapillary 42 and the optical fibers 38, 40 to form the mirrors 30, 32, a gage length L defined by the distance between the welds 82 can be accurately fixed. Indeed, if the optical fibers 38, 40 are welded to the microcapillary 42 where the thin layers forming the mirrors 30, 32 terminate over the tips of the optical fibers, the welds 82 will be precisely limited by these thin layers. The use of a microcapillary 42 in quartz allows an excellent welding since this is the same material as for the optical fibers 38, 40. Moreover, the quartz resists well to elongation. However, other materials such as stainless steel could be used as well, depending on the requirements to fulfill.

Referring to FIG. 4, the principle of the short Fabry-Perot cavity 26 combined with the Fizeau interferometer 50 can be easily applied for the measurement of other types of physical parameters. Indeed, the Fizeau interferometer 50 has the ability to accurately measure the optical distance between the mirrors of a short Fabry-Perot interferometer 20, whatever can cause the variation in the optical cavity length d. The Fabry-Perot interferometer 20 can be configured to be sensitive to parameters like pressure, temperature, refractive index of a liquid, etc.

Referring back to FIG. 3, microcapillaries normally used to mechanically slice (join) two optical fibers are well known. To reduce the Fresnel reflection at the interface of the optical fibers, those microcapillaries are provided with a channel in the middle, for putting a drop of index matching oil. If such a microcapillary is used with the Fabry-Perot interferometer 20 having its cavity length L physically fixed and the channel communicating with the Fabry-Perot cavity 26, the transmittance or reflectance will then vary by filling a space between the mirrors 30, 32 of the Fabry-Perot interferometer 20 with a liquid having a given refractive index n, as implied by relation (1). With such a microcapillary, the filling can be simply achieved by immersing the microcapillary into the liquid whose refractive index is to be measured.

Similarly, a temperature can be measured by providing the Fabry-Perot interferometer 20 with a translucent crystal (not shown in the Figure) having a refractive index exhibiting a strong variation to temperature. By optically coupling such a crystal to the tip of at least one of the optical fibers 38, 40, the temperature can be measured since the transmittance or reflectance properties of the Fabry-Perot cavity 26 are changed as a function of the refractive index n of the crystal, as implied by relation (1). The crystal must have two opposite ends (of which at least one is optically coupled to the corresponding fibers 38, 40) which are reflective so as to act as the mirrors 30, 32. If these ends of the crystal are not naturally reflective, suitable mirrors can be laid down thereto for the purpose.

Of course, different sensing Fabry-Perot interferometers 20 can be multiplexed as well in the latter embodiments.

The optimal reflectivity of the mirrors 30, 32 has been estimated to 30%. By increasing the reflectivity of the mirrors 30, 32 laid down on the tips of the optical fibers 38, 40, terms of higher orders in the cross-correlation function C(d) become significant. The presence of such terms added to the cross-correlation function C(d) makes the latter very difficult and even impossible to analyze. Otherwise, if the reflectivity is reduced, the visibility of the cross-correlation will decrease. Therefore, with a 30% reflectivity, the terms of higher order are negligible and the visibility of the first term is excellent. The reflectivity of the mirrors 30, 32 should be by the way 30% over all the range of wavelength, for example from 600 nm to 1000 nm for a quartz-halogen lamp.

EXPERIMENTAL RESULTS

Figure 17:
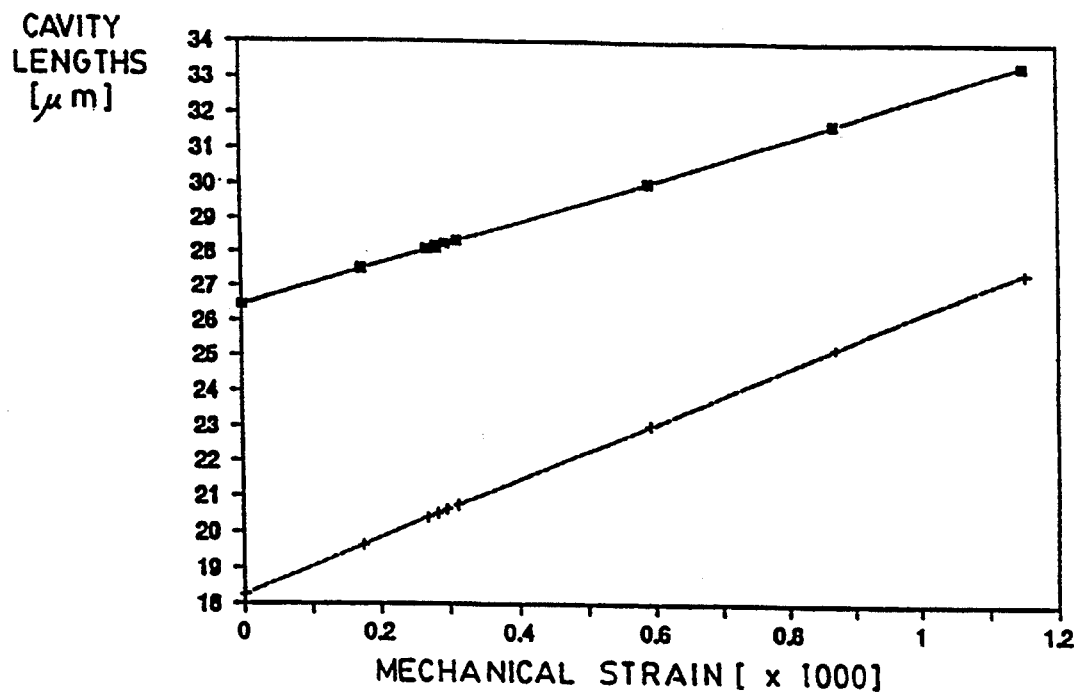
FIG. 17 shows a graph of cavity lengths of two Fabry-Perot interferometers (of an optical sensing device as shown in FIG. 10) bonded to a deforming body, as a function of mechanical strain measured by an electrical gage bonded to the same body.
Figure 18:
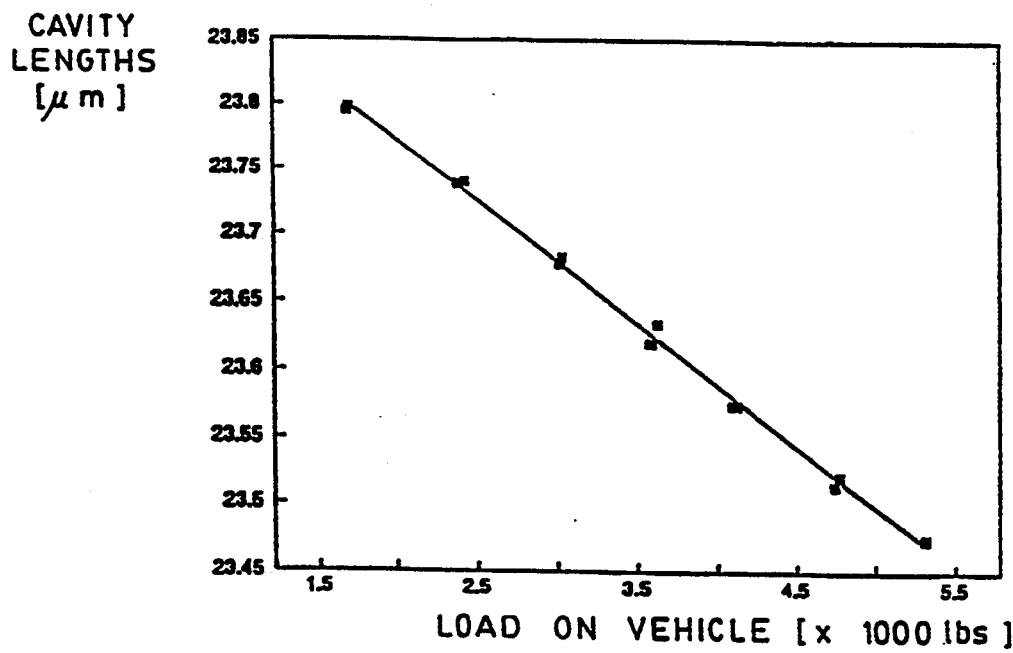
FIG. 18 shows a graph of the cavity length as a function of load for an optical sensing device bonded to an axle of a semi-trailer.
Figure 19:
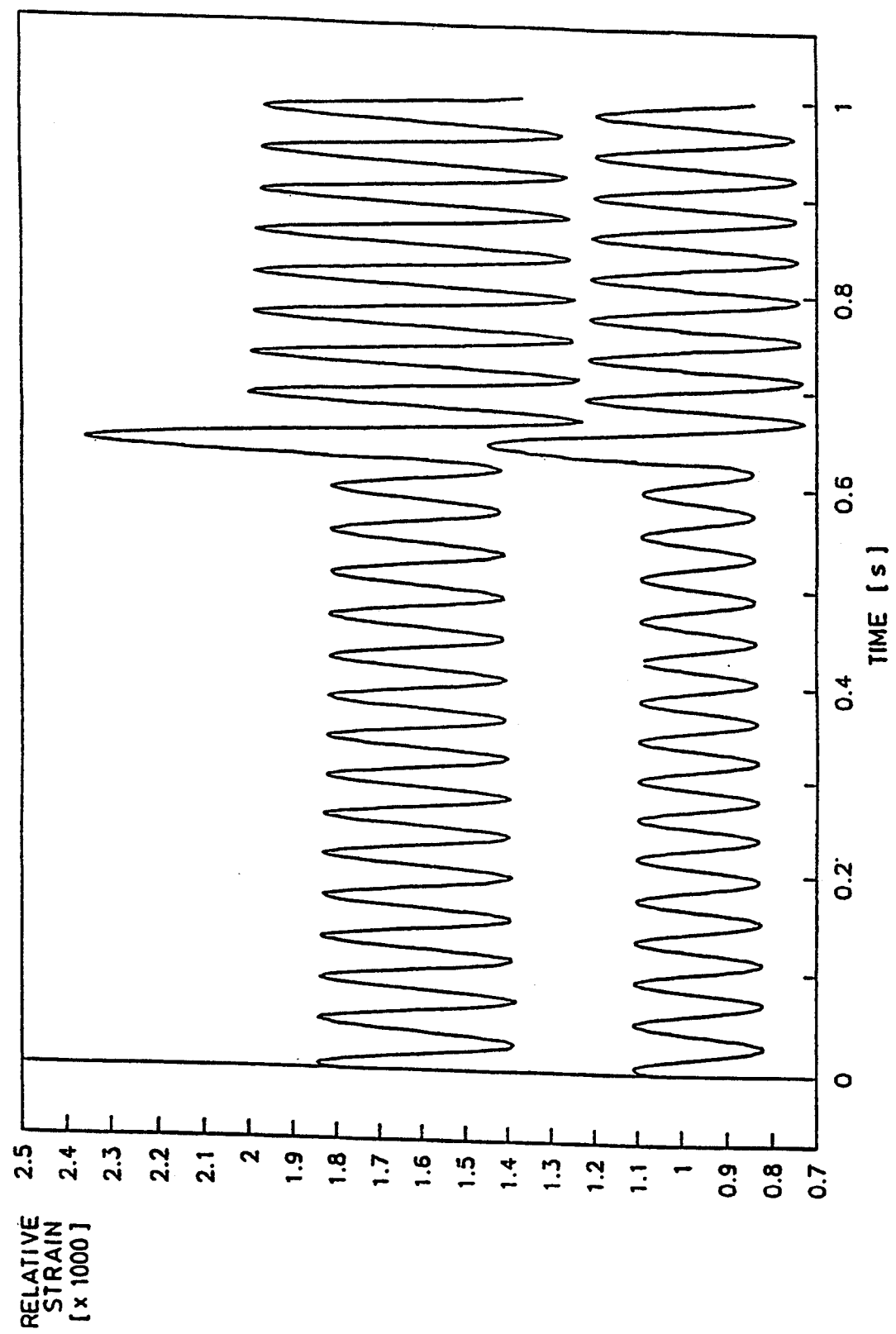
FIG. 19 shows a graph of relative strains as a function of time, measured respectively by an electrical gage (upper trace) and an optical sensing device (lower trace)

FIG. 17 illustrates the results obtained with two Fabry-Perot interferometers 20, 21 multiplexed in a way as shown in FIG. 10. The readings of the two Fabry-Perot interferometers 20, 21, each with a microcapillary as shown in FIG. 3 and bonded on a metallic piece undergoing a mechanical deformation, is plotted as a function of the reading of a conventional electrical gage. Referring to FIG. 18, there is shown the mechanical deformation of an axle of a semi-trailer as a function of its load, such as measured by an optical sensing device according to the invention installed on the axle. FIG. 19 illustrates the behavior of the optical sensing device in a dynamic test. The mechanical deformation is given as a function of time, the upper trace being produced by an electrical gage, while the lower trace being produced by an optical sensing device in reflection as shown in FIG. 7.

Figure 20:
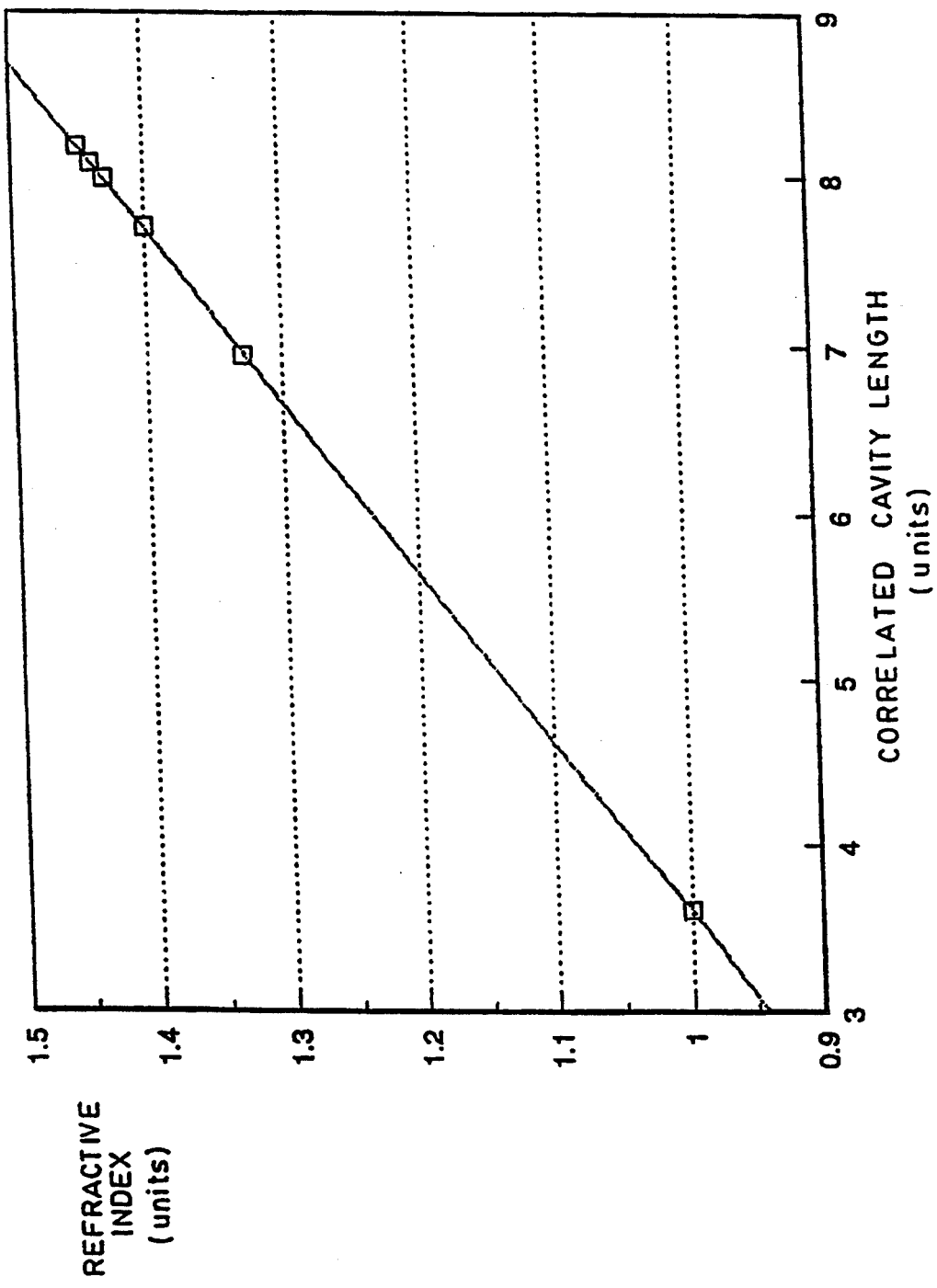
FIG. 20 shows a graph of the refractive index as a function of cavity length for an optical sensing device whose Fabry-Perot cavity is filled with liquids of various refractive index.

FIG. 20 illustrates results obtained with the optical sensing device in one of the above-mentioned embodiments, where the space between the mirrors 30, 32 of the Fabry-Perot interferometer 20 (as shown in FIG. 1) has been filled on six occasions with liquids having different refractive index. As shown by the linearity of the refractive index as a function of cavity length of the optical sensing device, the latter provides, in a practical point of view, a linear absolute response.

Although the present invention has been explained hereinafter by way of preferred embodiments thereof, it should be pointed out that any modifications to these preferred embodiments, within the scope of the appended claims, are not deemed to change or alter the nature and scope of the present invention.

What is claimed is:

1. An optical sensing device for measuring a physical parameter, to be connected to a light source for generating a multiple frequency light signal having predetermined spectral characteristics, said device comprising:
a) a Fabry-Perot interferometer through which the light signal is passed, said Fabry-Perot interferometer including two semi-reflective mirrors substantially parallel to one another and spaced by a given distance so as to define a Fabry-Perot cavity having transmittance or reflectance properties which are affected by said physical parameter and which cause said spectral characteristics of the light signal to vary in response to said physical parameter, said Fabry-Perot interferometer being provided with at least one optical fiber for transmitting the light signal into said Fabry-Perot cavity and for collecting at least a portion of the light signal outgoing thereof;
b) optical focusing means for focusing said at least a portion of the light signal; and
c) a Fizeau interferometer through which said focused light signal is passed, said Fizeau interferometer including optical wedge means forming a wedge-profiled Fizeau cavity from which exits a spatially-spread light signal indicative of said transmittance or reflectance properties of said Fabry-Perot interferometer;

whereby said physical parameter can be determined by means of said spatially-spread light signal.

2. An optical sensing device according to claim 1, further comprising photodetecting means positioned for receiving said spatially-spread light signal, for generating a set of discrete electrical signals representing said spatially-spread light signal.

3. An optical sensing device according to claim 1, further comprising a microcapillary having a longitudinal bore in which said mirrors of the Fabry-Perot interferometer are mounted, said at least one optical fiber having a tip connected to a corresponding one of said mirrors, a portion extending outside said bore, and a weld with the microcapillary, whereby said microcapillary can be bonded to a body whose deformation is to be measured, in order that the distance between said mirrors changes as a result of an elongation of the microcapillary, thereby varying the transmittance or reflectance properties of said Fabry-Perot cavity.

4. An optical sensing device according to claim 3, wherein said at least one optical fiber is a pair of multimode optical fibers, each of the tips of said optical fibers having a surface cleaved or polished at right angle and coated with the corresponding one of said mirrors.

5. An optical sensing device according to claim 3, wherein said Fabry-Perot interferometer is further provided with a thin wire made of a same material as said body, said thin wire having a tip connected to the other one of said mirrors, a portion extending therefrom in said bore, and a weld with said microcapillary, said other one of the mirrors being made of a light absorbing material for absorbing a portion of the light signal, each of the tips of said at least one optical fiber and said thin wire having a surface cleaved or polished at right angle and coated with the corresponding one of said mirrors, whereby a thermal expansion of said body is compensated by a similar thermal expansion of a portion of said thin wire within said bore.

6. An optical sensing device according to claim 4, wherein one of said optical fibers is optically coupled with said light source, and the other of said optical fibers is optically coupled to said optical focusing means.

7. An optical sensing device according to claim 3, further comprising an optical coupler for coupling the light signal into said at least one optical fiber and for coupling said at least a portion of the light signal transmitted by said at least one optical fiber into said optical focusing means, said optical coupler being optically coupled between said at least one optical fiber, said optical focusing means and said light source.

8. An optical sensing device according to claim 3, in combination with said light source, wherein said microcapillary is in quartz or stainless steel, the mirrors of said Fabry-Perot interferometer are 30% semi-reflective thin layers mirrors, said at least one optical fiber is a multimode optical fiber having a numerical aperture below or equal to 0,2, said focusing means are a cylindrical lens, said optical wedge means are two flat glass plates at an angle to one another, said light source is a quartz-halogen lamp or a broadband light emitting diode, and said photodetecting means are a linear photodiode array.

9. An optical sensing device according to claim 1, further comprising optical collimating means for collimating said at least a portion of the light signal, said optical collimating means being optically coupled between said Fabry-Perot interferometer and said optical focusing means.

10. An optical sensing device according to claim 1, wherein said optical wedge means are formed by a thin layer of dielectric material laid down on a flat glass plate, said thin layer having a variable width so as to form said wedge-profiled Fizeau cavity.

11. An optical sensing device according to claim 1, further comprising at least a second Fabry-Perot interferometer similar in structure to the first Fabry-Perot interferometer and connected thereto in series, a first one of said Fabry-Perot interferometers being optically coupled to said light source, and a last one of said Fabry-Perot interferometer being optically coupled to said optical focusing means, whereby at least another physical parameter can be measured by means of said at least a second Fabry-Perot interferometer, said spatially-spread light signal simultaneously exhibiting information on the physical parameters in respect with each of said Fabry-Perot interferometers.

12. An optical sensing device according to claim 1, further comprising at least a second Fabry-Perot interferometer similar in structure to the first Fabry-Perot interferometer, and an optical coupler for coupling the light signal into each of said Fabry-Perot interferometers and for coupling the portion of the light signal outgoing from each of said Fabry-Perot interferometers into said optical focusing means, said optical coupler being optically coupled to each of said Fabry-Perot interferometers, to said light source and to said optical focusing means, whereby at least another physical parameter can be measured by means of said at least a second Fabry-Perot interferometer, said spatially-spread light signal simultaneously exhibiting information on the physical parameters in respect with each of said Fabry-Perot interferometers.

13. An optical sensing device according to claim 1, in combination with said light source, further comprising at least a second light source and at least a second Fabry-Perot interferometer respectively similar in structure to the first light source and the first Fabry-Perot interferometer, each of said Fabry-Perot interferometers being optically coupled between the corresponding one of said light sources and said optical focusing means, whereby at least another physical parameter can be measured by means of said at least a second Fabry-Perot interferometer, only one of said light sources operating at a time such that said spatially-spread light signal only exhibits information on the physical parameter in respect with the one of said Fabry-Perot interferometers connected to said only one of the light sources.

14. An optical sensing device according to claim 2, further comprising at least a second Fabry-Perot interferometer similar in structure to the first Fabry-Perot interferometer, each of said Fabry-Perot interferometers being optically coupled in parallel between said light source and said optical focusing means, wherein said focusing means are arranged to produce at least a second focused light signal derived from said at least a second Fabry-Perot interferometer and distinct from the first focused light signal, and wherein said Fizeau interferometer is arranged to produce at least a second spatially-spread light signal derived from said at least a second focused light signal and distinct from the first spatially-spread light signal, said photodetecting means being a two-dimensional photodiode array generating at least a second set of discrete electrical signals representing said at least a second spatially-spread light signal, whereby at least another physical parameter can be measured by means of said at least a second Fabry-Perot interferometer, each of said spatially-spread light signals exhibiting respectively information on the physical parameter in respect with the corresponding one of said Fabry-Perot interferometers.

15. An optical sensing device according to claim 11, wherein said wedge means have a stepped-profiled surface for providing to said Fizeau cavity distinct ranges of cavity length, whereby crosstalk interferences in said spatially-spread light signal are suppressed.

16. An optical sensing device according to claim 4, wherein said mirrors of the Fabry-Perot interferometer are layers of dielectric material laid all around the tips of said optical fibers, said dielectric material having a temperature melting point higher than a temperature melting point of said microcapillary and said optical fibers, the welds of said optical fibers being precisely located where said thin layers terminate over the tips of said optical fibers, whereby a gage length defined between said welds can be precisely determined.

17. An optical sensing device according to claim 1, wherein said Fabry-Perot interferometer is further provided with means for filling a space between said mirrors of the Fabry-Perot interferometer with a liquid having a refractive index which exhibits a variation as a function of said parameter, said distance between the mirrors being fixed.

18. An optical sensing device according to claim 1, wherein said Fabry-Perot interferometer includes a translucent crystal having a refractive index that exhibits a variation as a function of temperature, and opposite flat surfaces respectively forming said mirrors of the Fabry-Perot interferometer, said distance between the mirrors being fixed, whereby said temperature can be measured.

19. An optical sensing device according to claim 1, wherein said Fabry-Perot interferometer includes a translucent crystal having a refractive index that exhibits a variation as a function of temperature, and opposite flat surfaces on which said mirrors of the Fabry-Perot interferometer are respectively laid down, said distance between the mirrors being fixed, whereby said temperature can be measured.

20. An optical sensing method for measuring a physical parameter, comprising steps of:
 a) generating a multiple frequency light signal having predetermined spectral characteristics;
 b) passing the light signal in a Fabry-Perot interferometer including two semi-reflective mirrors substantially parallel to one another and spaced by a given distance so as to define a Fabry-Perot cavity having transmittance or reflectance properties which are affected by said physical parameter and which cause said spectral characteristics of the light signal to vary in response to said physical parameter, the light signal being transmitted into said Fabry-Perot cavity with at least one optical fiber, and at least a portion of the light signal outgoing from said Fabry-Perot cavity being collected with said at least one optical fiber;

c) focusing said at least a portion of the light signal; and d) passing the focused light signal through a Fizeau interferometer for converting the focused light signal into a spatially-spread light signal indicative of said transmittance or reflectance properties of said Fabry-Perot interferometer;

whereby said physical parameter can be determined by means of said spatially-spread light signal.

21. An optical sensing method according to claim 20, further comprising a step of converting said spatially-spread light signal into a set of discrete electrical signals representing said spatially-spread light signal.

22. An optical sensing method according to claim 20, wherein the light signal is also passed through at least a second Fabry-Perot interferometer in step b), whereby at least a second physical parameter can be measured and determined by means of said spatially-spread light signal.

23. An optical sensing method according to claim 20, wherein the light signal is also passed through at least a second Fabry-Perot interferometer in step b), the portions of the light signal outgoing each of said Fabry-Perot interferometers are distinctly focused in step c) and converted in step d) so as to produce at least a second spatially-spread light signal, whereby at least a second physical parameter can be measured and determined by means of said at least a spatially-spread light signal.

24. An optical sensing method according to claim 20, further comprising a step of focusing at least a portion of the light signal before said step c).

25. A thermally self-compensated Fabry-Perot strain gage for measuring a deformation of a body, comprising:

a Fabry-Perot interferometer through which a light signal having predetermined spectral characteristics is passed, said Fabry-Perot interferometer including two semi-reflective mirrors substantially parallel to one another and spaced by a given distance so as to define a Fabry-Perot cavity having reflectance properties which are affected by a change in said distance and which cause said spectral characteristics of the light signal to vary in response to said change, said Fabry-Perot interferometer being provided with at least one optical fiber for transmitting the light signal into said Fabry-Perot cavity and for collecting at least a portion of the light signal outgoing thereof;

a microcapillary having a longitudinal bore in which said mirrors of the Fabry-Perot interferometer are mounted, said at least one optical fiber having a tip connected to a corresponding one of said mirrors, a portion extending outside said bore, and a weld with the microcapillary; and a thin wire made of a thermally expanding material, said thin wire having a diameter approximately equal to a diameter of said at least one optical fiber, said thin wire having a tip connected to the other one of said mirrors, a portion extending therefrom in said bore, and a weld with said microcapillary causing said portion to move said other one of said mirrors relative to said corresponding one of said mirrors upon thermal expansion of said material;

whereby a change in said distance between said mirrors produced by a thermal expansion of said body is compensated by a thermal expansion of said portion of said thin wire within said bore.

26. A thermally self-compensated Fabry-Perot strain gage according to claim 25, wherein each of the tips of said at least one optical fiber and said thin wire has a surface cleaved or polished at right angle and coated with the corresponding one of said mirrors.

27. A thermally self-compensated Fabry-Perot strain gage according to claim 26, wherein said other one of the mirrors is made of a light absorbing material for absorbing a portion of the light signal.

* * * * *